(12) United States Patent
Uchino et al.

(10) Patent No.: US 6,800,268 B2
(45) Date of Patent: Oct. 5, 2004

(54) METHOD FOR PRODUCING POTASSIUM FLUORONIOBATE CRYSTALS AND POTASSIUM FLUORONIOBATE CRYSTALS

(75) Inventors: Yoshitsugu Uchino, Tokyo-To (JP); Masanori Kinoshita, Tokyo-To (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 130 days.

(21) Appl. No.: 10/182,302

(22) PCT Filed: Nov. 20, 2001

(86) PCT No.: PCT/JP01/10123

§ 371 (c)(1),
(2), (4) Date: Jul. 26, 2002

(87) PCT Pub. No.: WO02/44087

PCT Pub. Date: Jun. 6, 2002

(65) Prior Publication Data

US 2003/0049196 A1 Mar. 13, 2003

(30) Foreign Application Priority Data

Nov. 29, 2000 (JP) ........................................ 2000-362586

(51) Int. Cl.[7] .............................................. C01G 35/00
(52) U.S. Cl. ...................................... 423/464; 423/463
(58) Field of Search ................................. 423/463, 464

(56) References Cited

U.S. PATENT DOCUMENTS

| | | | | |
|---|---|---|---|---|
| 4,012,293 A | * | 3/1977 | Meyerhoff | 205/51 |
| 2003/0136330 A1 | * | 7/2003 | Sohama et al. | 117/2 |

FOREIGN PATENT DOCUMENTS

| | | | | |
|---|---|---|---|---|
| JP | 63-045106 A | | 2/1988 | |
| JP | 02070028 A | * | 3/1990 | ........... C22B/34/20 |
| JP | 2001-329321 A | | 11/2001 | |
| JP | 2002-008952 A | | 1/2002 | |
| JP | 2002308624 A | * | 10/2002 | ........... C01G/33/00 |

OTHER PUBLICATIONS

Zerikman, A.N. et al.; Niobu to Tantaru, Nisso Tsushin–sha, Tokyo, Japan; 1990; Pittsburgh, Pennsylvania. 61–64; p. 107.

* cited by examiner

*Primary Examiner*—Ngoc-Yen Nguyen
(74) *Attorney, Agent, or Firm*—Webb Ziesenheim Logsdon Orkin & Hanson, P.C.

(57) ABSTRACT

Disclosed herein is a method for producing potassium fluoroniobate crystals by which highly pure, large-sized potassium fluoroniobate crystals can be obtained in high yield and which is advantageous from the viewpoints of material cost and material-dissolving operation; and potassium fluoroniobate crystals. This production method comprises the first and second steps (a) and (b) of (a) adding a potassium-containing electrolyte to a starting material comprising niobium to precipitate potassium oxyfluoroniobate and/or fluoroniobate as coarse crystals, and separating the coarse crystals by filtration, and (b) dissolving the coarse crystals in a recrystallization solvent that is an aqueous solution comprising 12 to 35% by weight of hydrofluoric acid and that has been heated to a temperature of 50° C. or more, and cooling the solution to 40° C. or lower at a cooling rate of less than 20° C./h to precipitate potassium fluoroniobate as crystals.

20 Claims, 1 Drawing Sheet

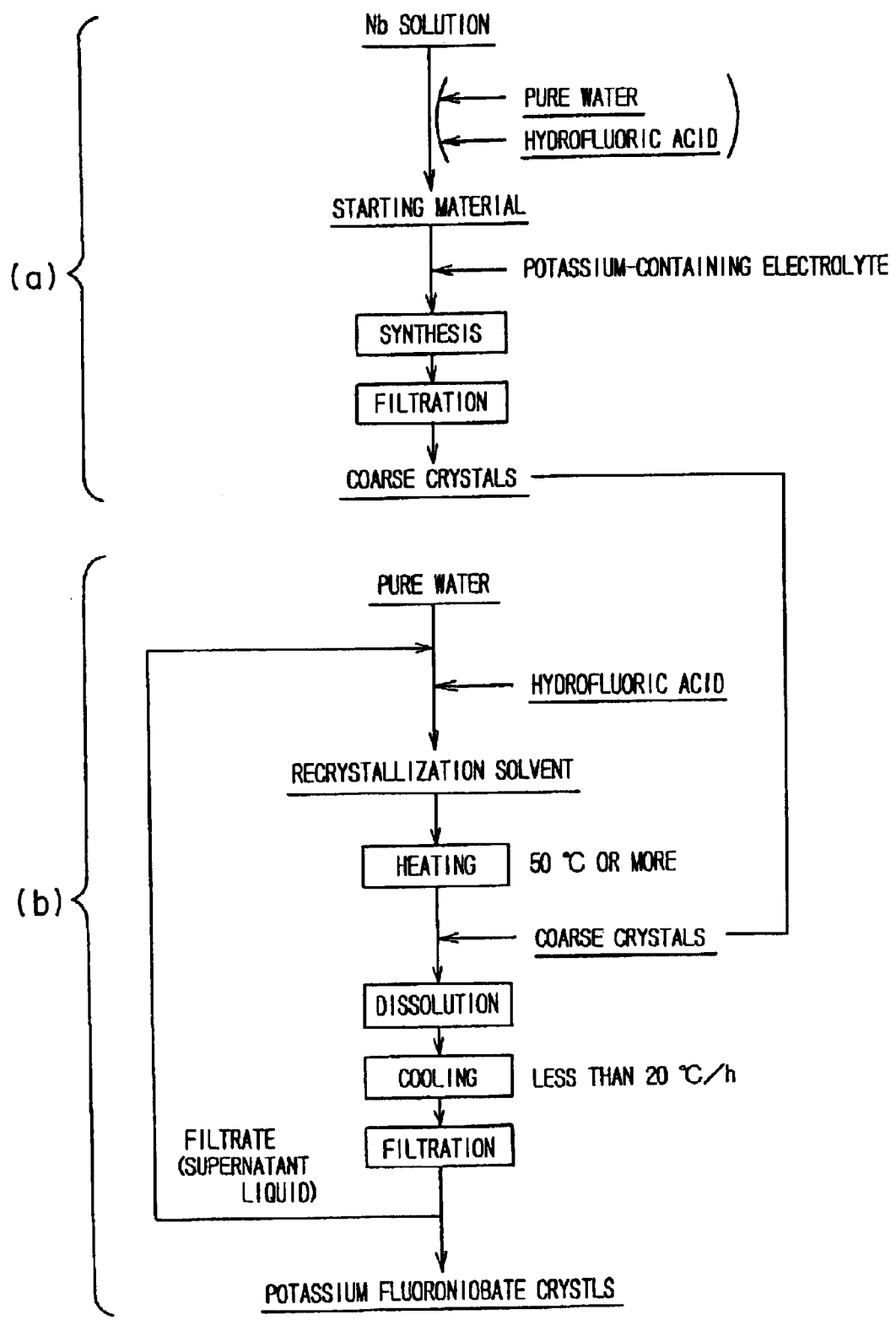
F I G. 1

METHOD FOR PRODUCING POTASSIUM FLUORONIOBATE CRYSTALS AND POTASSIUM FLUORONIOBATE CRYSTALS

BACKGROUND OF THE INVENTION

1. Field of the Invention

The present invention relates to a method for producing potassium fluoroniobate crystals by which highly pure, large-sized potassium fluoroniobate crystals can be obtained in high yield and which is advantageous from the viewpoints of material cost and material-dissolving operation, and to potassium fluoroniobate crystals.

2. Background Art

Potassium fluoroniobate is used as raw material in the production of niobium powder. Since niobium powder has the effect of stabilizing carbon present in steels to inhibit intergranular corrosion, it is used as a steel additive, and this is the greatest use of niobium powder. Further, niobium alloys have been practically used for conductive tubes that are placed in the light-emitting parts of high-pressure sodium vapor lamps. Furthermore, niobium is employed as an additional element in superconductive materials and superalloys. Niobium powder is now being put to practical use for condensers.

A fractional crystallization process (Malinyak process) has conventionally been known as a method for obtaining potassium fluorotantalate crystals ($K_2TaF_7$) and potassium oxyfluoroniobate crystals ($K_2NbOF_5 \cdot H_2O$) from a solution containing tantalum and niobium (see Zerikman, A. N., et al., "Niobu to Tantaru" (or Niobium and Tantalum), pp. 61–64, Nisso Tsushin-sha, Tokyo, Japan). This process is carried out in the following manner. A starting material, a solution containing tantalum and niobium, is diluted to such an extent that $K_2NbOF_5$ is not crystallized, and potassium chloride or the like is added to the dilute solution to crystallize $K_2TaF_7$. The $K_2TaF_7$ crystals are filtered off, and the filtrate is concentrated to precipitate $K_2NbOF_5 \cdot H_2O$ as coarse crystals. The coarse crystals are then dissolved in a 1–2 wt. % hydrofluoric acid solution to recrystallize potassium oxyfluoroniobate ($K_2NbOF_5 \cdot H_2O$) from this solution. A problem with this process is that it is not easy to remove, as $K_2TaF_7$ crystals, all of the tantalum from the starting material, so that the coarse $K_2NbOF_5 \cdot H_2O$ crystals are to inevitably contain tantalum. It is difficult to reduce this tantalum remaining in the coarse $K_2NbOF_5 \cdot H_2O$ crystals even by recrystallization. This problem of tantalum contamination does not occur if a starting material containing niobium but no tantalum is used.

Another problem with the above process is that, in the above-described step of recrystallization, recrystallized from the hydrofluoric acid solution having a low concentration of 1 to 2% by weight is potassium oxyfluoroniobate ($K_2NbOF_5 \cdot H_2O$) rather than potassium fluoroniobate. Such a problem never occurs when the corresponding tantalum-containing coarse crystals are subjected to the similar recrystallization; this problem is therefore peculiar to niobium. To obtain potassium fluoroniobate crystals, it is necessary to further conduct recrystallization by the use of a hydrofluoric acid solution having a concentration of as high as 12 to 15% by weight (see Zerikman, A. N., et al., "Niobu to Tantaru", p. 107, Nisso Tsushin-sha, Tokyo, Japan). The reason why potassium fluoroniobate crystals are needed is that, since potassium oxyfluoroniobate contains a large amount of oxygen, it is not adequate as a starting material for the production of niobium powder.

The above-cited reference "Niobu to Tantaru" also describes the following: potassium fluoroniobate ($K_2NbF_7$) is more stable than potassium oxyfluoroniobate ($K_2NbOF_5 \cdot H_2O$) in a hydrofluoric acid solution having a high concentration of 7% by weight or more. If this description is taken into consideration, it might be possible to produce, without effecting recrystallization, potassium fluoroniobate crystals in one step by adding a potassium-containing electrolyte to a niobium solution containing hydrofluoric acid in high concentration. However, we now found that, even if this method is adopted, potassium oxyfluoroniobates of other types, identified as $K_3Nb_2F_{11}O$, for instance, by X-ray diffractometry are inevitably present in the resulting crystals unless the concentration of hydrofluoric acid in the niobium solution exceeds 30%. It is therefore not so easy to obtain satisfactorily highly pure potassium fluoroniobate even by this method.

Thus, crystals synthesized from a niobium solution tend to contain, in addition to potassium fluoroniobate (i.e., $K_2NbF_7$), a small or large amount of one or more potassium oxyfluoroniobates (i.e., $K_3Nb_2F_{11}O$, $KNb_2O_5F$, $KNbO_2F$ and/or $K_2NbOF_5 \cdot H_2O$ etc.) regardless of whether the concentration of hydrofluoric acid in the niobium solution is high or low. Moreover, it is often observed that only potassium oxyfluoroniobate crystals precipitate.

SUMMARY OF THE INVENTION

We now found the following: if the first step of forming coarse crystals that may contain potassium oxyfluoroniobate and the second step of subjecting the coarse crystals to recrystallization using a hydrofluoric acid solution whose concentration is at least 12% by weight are effected in combination, highly pure potassium fluoroniobate crystals can be obtained, without forming unwanted by-products, by using as a starting material a niobium solution obtainable from solvent extraction, which is inexpensive. Namely, we found that it is possible to produce potassium fluoroniobate crystals in high yield by a method advantageous from the viewpoints of material cost and material-dissolving operation. We also found that it is possible to obtain sufficiently large-sized potassium fluoroniobate crystals in a large amount per operation if the temperature and cooling rate in the recrystallization step are properly controlled.

An object of the present invention is therefore to provide a method for producing potassium fluoroniobate crystals by which highly pure, large-sized potassium fluoroniobate crystals can be obtained and which is advantageous from the viewpoints of material cost and material-dissolving operation; and potassium fluoroniobate crystals.

To fulfil the above object, the present invention provides a method for producing potassium fluoroniobate crystals, comprising the first and second steps (a) and (b) of:

(a) adding a potassium-containing electrolyte to a starting material comprising niobium to precipitate potassium oxyfluoroniobate and/or fluoroniobate as coarse crystals, and separating the coarse crystals by filtration; and (b) dissolving the coarse crystals in a recrystallization solvent that is an aqueous solution comprising 12 to 35% by weight of hydrofluoric acid and that has been heated to a temperature of 50° C. or more, and cooling the solution to 40° C. or lower at a cooling rate of less than 20° C./h to precipitate potassium fluoroniobate as crystals.

Further, the present invention provides potassium fluoroniobate crystals consisting essentially of potassium fluoroniobate, containing 30% by weight or more of crystals having sizes of 0.5 mm or more as determined by sieve analysis.

BRIEF DESCRIPTION OF THE DRAWING

FIG. 1 is a flow chart showing one example of the process of potassium fluoroniobate formation in the production method according to the present invention.

DETAILED DESCRIPTION OF THE INVENTION

The method for producing potassium fluoroniobate crystals according to the present invention and potassium fluoroniobate crystals of the invention will be specifically described hereinafter.

Method for Producing Potassium Fluoroniobate Crystals

The process of producing potassium fluoroniobate crystals according to the present invention is shown in FIG. 1. As shown in this figure, potassium fluoroniobate crystals are produced via a first step (a) in which coarse potassium oxyfluoroniobate and/or fluoroniobate crystals are formed by synthesis and a second step (b) in which the coarse crystals are subjected to recrystallization.

Starting Material

In the production method according to the present invention, a solution comprising niobium is used as the starting material. To prepare the niobium solution, any one of various known methods can be adopted, and, moreover, any solvent can be used. For example, a purified aqueous niobium solution obtained from the process of solvent extraction of tantalum/niobium, which is widely effected in the industrial fields, can be used as the starting material. It is also possible to use an aqueous solution that is obtained by filtering a solution prepared by dissolving, in hydrofluoric acid, niobium-containing scraps or the like containing only a small amount of impurities, and that has not been subjected to solvent extraction.

There is no particular limitation on the concentration of niobium in the starting material. It is however preferable to make the concentration of niobium in the starting material from 60 to 400 g/l, more preferably from 100 to 300 g/l. As long as the concentration of niobium is in this range, crystals precipitate in a large amount per operation, and high yield can thus be attained. In addition, the stirring and filtration of the fluid containing the crystals that have precipitated can be effected without difficulty. It is enough that the purity of the niobium in the niobium solution be at least 99% (e.g., approximately 99.9% to 99.99%). It is not necessary to make the purity higher, but, of course, niobium having higher purity may be used. It is noted that the amount of tantalum, one of impurities, cannot be decreased even by the production method according to the present invention. Therefore, to produce potassium fluoroniobate crystals having extremely high purity, it is desirable to use a starting material comprising a niobium solution from which tantalum has fully been removed by solvent extraction or the like.

According to a preferred embodiment of the present invention, the niobium solution comprises water and/or hydrofluoric acid. This means that water may be added for dilution when the concentration of niobium in the solution is excessively high, and that hydrofluoric acid may be incorporated as the source of hydrofluoric acid to be used in the synthesis of potassium fluoroniobate crystals. It is noted that potassium fluoride, which may be used as a potassium-containing electrolyte that will be described later, also serves as the source of hydrofluoric acid. Therefore, it is not always necessary to incorporate hydrofluoric acid into the niobium solution if potassium fluoride is added as the potassium-containing electrolyte.

In the case where hydrofluoric acid is incorporated into the starting material, it is preferable to make the concentration of hydrofluoric acid in the starting material 35% by weight or less, more preferably 30% by weight or less, most preferably 25% by weight or less. As long as the concentration of hydrofluoric acid in the starting material is in this range, the desired crystals can be obtained in satisfactorily high yield if the concentration of niobium in the starting material and the amount of the potassium-containing electrolyte added are adequate. Moreover, the production facility hardly undergoes corrosion, and the starting material can easily be handled; a starting material containing hydrofluoric acid in a concentration in the above-described range is thus advantageous from the viewpoints of facility and operation. In the starting material containing hydrofluoric acid, niobium is believed to exist in the form of $K_2NbOF_5$ and/or $H_2NbF_7$.

(a) First Step (Step of Forming Coarse Crystals)

In the first step of the production method according to the present invention, a prescribed potassium-containing electrolyte is added to the above-described starting material to precipitate potassium oxyfluoroniobate and/or fluoroniobate as coarse crystals. As mentioned previously, niobium tends to form oxyfluoride salts (e.g., $K_3Nb_2F_{11}O$) rather than fluoride salts (e.g., $K_2NbF_7$), and this tendency is marked as compared with tantalum, which resembles niobium in its properties. In this first step, it does not matter if oxyfluoride salts are produced.

Any electrolyte can be used as the potassium-containing electrolyte for use in the present invention as long as it can release potassium ions. Preferable examples of potassium-containing electrolytes useful herein include potassium chloride, potassium carbonate, potassium hydroxide, potassium fluoride, and combinations thereof. Of these, potassium chloride is preferred because it is easy to handle and inexpensive. Further, the use of potassium fluoride is advantageous from the viewpoints of facility and operation. This is because, if potassium fluoride is used as the electrolyte, it is possible to synthesize potassium fluoroniobate crystals by using a minimum amount of hydrofluoric acid, or even without using it.

When potassium chloride is added as the potassium-containing electrolyte, it is believed that the following reactions take place to mainly yield coarse potassium oxyfluoroniobate ($K_3Nb_2F_{11}O$) crystals although reactions that take place herein are not limited to the following ones:

$$2H_2NbF_5O+HF+3KCl \rightarrow K_3Nb_2F_{11}O+3HCl \text{ and/or } H_2NbF_7+2KCl \rightarrow K_2NbF_7+2HCl.$$

In the present invention, the potassium-containing electrolyte may be added as it is, that is, in solid form, or after it is made into a solution. It is however preferable to add the electrolyte in solid form because, by doing so, it is possible to minimize the amount of fluid in the system and, consequently, that of waste water. It is preferable to add the potassium-containing electrolyte in such an amount that the molar ratio of potassium to niobium will be from 2 to 10, more preferably from 2 to 7. When the potassium-containing electrolyte is added in an amount smaller than this range, potassium fluoroniobate is not fully crystallized, so that the yield of potassium fluoroniobate crystals becomes low. On the other hand, when the potassium-containing electrolyte is used in an amount greater than the above-described range, the excess potassium-containing electrolyte that does not contribute to the formation of crystals is to exist in a large amount; this is unfavorable from the viewpoint of cost.

According to a preferred embodiment of the present invention, the temperature of the starting material at the time when the potassium-containing electrolyte is added thereto is between 30° C. and 70° C., and that of the starting material at the time when the coarse crystals are filtered off is less than 30° C. By so controlling the temperature of the starting material, it is possible to make the difference between the solubility at the time of the addition of the electrolyte and that at the time of filtration great; coarse crystals thus precipitate in an increased amount. The reason why the temperature of the starting material at the time when the potassium-containing electrolyte is added thereto is made between 30° C. and 70° C. is as described below. If this temperature is lower than 30° C., the difference between this temperature and the temperature of the starting material at the time of filtration is so small that crystals cannot grow well. The resulting crystals are therefore small in size, and it takes a lot of time to separate such small-sized crystals by filtration. On the other hand, the heating cost is increased if the temperature of the starting material is raised to higher than 70° C. In addition, excessively large-sized crystals are produced if the electrolyte is added to the starting material at a temperature of more than 70° C.; it will take a lot of time to dissolve such large-sized crystals in a recrystallization solvent in the second step. Further, the reason why the temperature of the starting material at the time when the coarse crystals are filtered off is made lower than 30° C. is as follows: as long as this temperature is lower than 30° C., only a small amount of niobium remains in the filtrate, so that the loss of niobium becomes almost nil. The above two operations may also be effected at room temperature. To effect the operations at room temperature is advantageous in that the operations require neither heating facility nor cooling facility, although the temperature of the starting material at the time when the potassium-containing electrolyte is added thereto may become lower than 30° C., and a little bit longer time may be required for filtration, or although the temperature of the starting material at the time when the coarse crystals are filtered off may become higher than 30° C., and the yield of niobium may be somewhat lowered.

In the first step in the present invention, the fluid containing the coarse crystals that have precipitated is filtered to separate the coarse crystals. As mentioned previously, the coarse crystals thus obtained contain a small or large amount of potassium oxyfluoroniobate in addition to potassium fluoroniobate, or consist essentially of potassium oxyfluoroniobate.

According to a preferred embodiment of the present invention, the molar ratio K/Nb in the coarse crystals (i.e., coarse potassium oxyfluoroniobate crystals, or a mixture of coarse potassium oxyfluoroniobate crystals and coarse potassium fluoroniobate crystals) is from 1.0 to 5.0. As long as this molar ratio falls in the above range, it is avoided in the subsequent recrystallization step that crystals precipitate in a decreased amount because of the lack of K. It is also avoided that the solubility is lowered due to excess K to make crystals precipitate in a decreased amount. Thus, a satisfactorily large amount of crystals can be obtained by recrystallization.

In the production method according to the present invention, the coarse crystals obtained are subjected to the below-described second step (b) of recrystallization.

(b) Second Step (Step of Forming Crystals by Recrystallization)

In the second step of the production method according to the present invention, a recrystallization solvent, which is an aqueous solution comprising 12 to 35% by weight of hydrofluoric acid, is heated to 50° C. or more; the aforementioned coarse crystals are dissolved in this recrystallization solvent; and the solution is cooled to 40° C. or lower at a cooling rate of less than 20° C./h to precipitate potassium fluoroniobate as crystals.

The recrystallization solvent for use in the present invention is an aqueous solution comprising hydrofluoric acid. The concentration of hydrofluoric acid in the recrystallization solvent is from 12 to 35% by weight, preferably from 16 to 30% by weight. As long as the concentration of hydrofluoric acid in the recrystallization solvent is in this range, potassium fluoroniobate crystals containing no potassium oxyfluoroniobate can easily be obtained. In addition, the production facility hardly undergoes corrosion, and the starting material can easily be handled; the above-described concentration range is thus advantages from the viewpoints of facility and operation.

Further, the recrystallization solvent for use in the present invention may comprise hydrochloric acid in addition to hydrofluoric acid. When the recrystallization solvent containing both hydrofluoric acid and hydrochloric acid is used, the solubility of potassium fluoroniobate becomes higher in the entire temperature range. In this case, the solubility is greatly increased at a temperature at which the coarse crystals are dissolved in the recrystallization solvent (this temperature being relatively high), whereas it is only slightly increased at a temperature to which the solution obtained is cooled (this temperature being relatively low). For this reason, potassium fluoroniobate crystals are obtained in a large amount as compared with the case where the recrystallization solvent containing no hydrochloric acid is used. It is preferable to make the concentration of hydrochloric acid in the recrystallization solvent from 1 to 10% by weight, more preferably from 2 to 6% by weight if the solubility and the cost of potassium fluoroniobate are taken into consideration.

In the second step in the present invention, the coarse crystals obtained in the first step (a) are dissolved in the recrystallization solvent after heating the recrystallization solvent to a temperature of 50° C. or more, preferably a temperature between 50° C. and 70° C., more preferably a temperature between 60° C. and 70° C. If the recrystallization solvent has been heated only to a temperature of less than 50° C., crystals precipitate in a decreased amount while the solution is cooled, so that the yield of the crystals is low. On the other hand, to heat the recrystallization solvent to an excessively high temperature is unfavorable from the viewpoints of facility and operational cost. It is preferable to dissolve the coarse crystals in the recrystallization solvent while holding the recrystallization solvent at the temperature raised. However, the following manner may also be adopted: the recrystallization solvent is heated to a temperature that is slightly higher than the target temperature, and the coarse crystals are dissolved in this solvent while cooling the solvent in the air so that the temperature of the solvent can reach the target temperature when the dissolution of the coarse crystals is completed.

The coarse crystals may be dissolved in the recrystallization solvent in any amount. It is however preferable to make the concentration of the coarse crystals in the recrystallization solvent slightly lower than the solubility of potassium fluoroniobate, which is determined by the temperature of the solution of the coarse crystals in the recrystallization solvent and by the concentrations of hydrofluoric acid and hydrochloric acid (if present) in the recrystallization solvent. If the coarse crystals are dissolved in the recrystallization solvent in an excessively large amount, a large part of the crystals remain undissolved. This brings about the precipitation of fine-sized crystals and the contamination of impure coarse potassium fluoroniobate crystals. On the other hand, if the coarse crystals are dissolved in the recrystallization solvent in an insufficient amount, crystals precipitate only in a small amount.

In the second step in the present invention, the solution obtained by dissolving the coarse potassium fluoroniobate crystals in the recrystallization solvent is cooled to precipitate potassium fluoroniobate as crystals. The solution is cooled to a temperature of 40° C. or less, preferably a temperature of 30° C. or less. If the solution is cooled only to a temperature of more than 40° C., crystals precipitate only in an unsatisfactorily small amount to make the yield low.

It is herein necessary that the solution be cooled at a rate of less than 20° C./h, preferably at a rate of less than 10° C./h, more preferably at a rate of less than 6° C./h. As long as the cooling rate is in this range, satisfactorily large-sized potassium fluoroniobate crystals can be obtained. This is because the rate of crystal growth is believed to be greater than that of the formation of fine-sized crystals. It is not necessary to make the cooling rate almost constant from the beginning to the end of the cooling operation; the cooling rate may be changed within the above-described range in the course of the cooling operation.

According to a preferred embodiment of the present invention, the production method may further comprise, before the step of cooling the solution of the coarse potassium fluoroniobate crystals in the recrystallization solvent, the step of removing fine particles remaining in this solution. If this step is effected, the precipitation of fine-sized crystals that is brought about by fine particles does not occur, and crystals that are larger in size can be obtained. Any of various known methods can be adopted to remove the fine particles, and a method using a mesh filter, for example, is preferred because it can easily be effected. In the step of removing the fine particles, the temperature of the solution might become low to make crystals precipitate if the solubility is not sufficiently high. It is therefore desirable that the coarse potassium fluoroniobate crystals be dissolved in the recrystallization solvent in an amount slightly smaller than that in the case where the step of removing fine particles is not effected, or at a temperature slightly higher than that in the case where the step of removing fine particles is not effected.

The fluid containing the crystals that have precipitated is subjected to filtration to separate it into the crystals and filtrate. The crystals thus obtained are potassium fluoroniobate crystals, an object of the present invention.

(c) Optional Steps

According to a preferred embodiment of the present invention, the potassium fluoroniobate crystals obtained in the aforementioned step (b) are washed with an aqueous solution of a potassium-containing electrolyte, and then dried. This step is effective in removing those impurities attached to the potassium fluoroniobate crystals to make their purity higher. In this step, water should not be used to wash the potassium fluoroniobate crystals. This is because water can dissolve the surfaces of the potassium fluoroniobate crystals, and potassium oxyfluoroniobate crystals can unfavorably precipitate at the dissolved parts of the surfaces. This problem never occurs when the crystals are washed with an aqueous solution of a potassium-containing electrolyte, and highly pure potassium fluoroniobate crystals containing substantially no potassium oxyfluoroniobate can successfully be obtained. It is noted that, even if potassium fluorotantalate crystals are washed with water, potassium oxyfluorotantalate crystals do not precipitate; it can therefore be said that the above-described problem is peculiar to potassium fluoroniobate crystals.

Any potassium-containing electrolyte can be used herein as long as it can release potassium ions and does not react with potassium fluoroniobate. Preferable examples of potassium-containing electrolytes useful herein include potassium chloride and potassium fluoride. There is no particular limitation on the concentration of the potassium-containing electrolyte in its aqueous solution; however, this concentration is preferably 50 g/l or more, more preferably 75 g/l or more, most preferably 100 g/l or more.

According to a preferred embodiment of the present invention, the production method may further comprise the step of passing the potassium fluoroniobate crystals obtained in the aforementioned step (b) through a sieve having an opening of 3.35 to 6.7 mm. Excessively large-sized crystals are removed by this step, and those potassium fluoroniobate crystals that are moderately large and uniform in size can be obtained. By lightly crushing those crystals remaining on the sieve, and passing the crushed crystals through the sieve again, it is possible to minimize the loss of the crystals.

According to a preferred embodiment of the present invention, the production method may further comprise the step of recycling, as a part or whole of the recrystallization solvent in the step (b), the supernatant liquid of the fluid containing the potassium fluoroniobate crystals that have precipitated and/or the filtrate obtained from the filtration of the fluid. According to another preferred embodiment of the present invention, the production method may further comprise the step of recycling, as a part or whole of the starting material, the filtrate obtained from the filtration carried out in the step (b). In these embodiments, precious niobium resources can fully be utilized without any loss. Moreover, the filtrate contains hydrofluoric acid, so that it is possible to make the amount of hydrofluoric acid to be added considerably small as compared with the case where the filtrate is not recycled.

Potassium Fluoroniobate Crystals

The potassium fluoroniobate crystals obtained by the above-described production method according to the present invention consist essentially of potassium fluoroniobate, and are large in size. They contain 30% by weight or more, preferably 50% by weight or more, more preferably 60% by weight or more, and most preferably 80% by weight or more of crystals having sizes of 0.5 mm or more as determined by sieve analysis. As long as the potassium fluoroniobate crystals have large sizes as described above, they are not blown up in a heating oven in an apparatus for reduction with sodium, so that they do not stain the inside of the apparatus, or are not lost. Thus, the potassium fluoroniobate crystals of the invention are improved in handling properties. Further, it is considered that the purity of potassium fluoroniobate crystals depends on their sizes, and, in general, larger crystals have higher purity. This is another advantage of large-sized crystals.

According to a preferred embodiment of the present invention, the potassium fluoroniobate crystals contain not more than 10% by weight, preferably not more than 5% by weight, more preferably not more than 3% by weight, and most preferably not more than 1% by weight of crystals having sizes of less than 0.045 mm as determined by sieve analysis. As long as the content of such small-sized crystals in the potassium fluoroniobate crystals falls in this range, it is easy to quantitatively supply the crystals to the reduction oven, and, moreover, dust is scarcely raised.

According to a preferred embodiment of the present invention, the potassium fluoroniobate crystals contain not more than 1% by weight, preferably not more than 0.5% by weight, more preferably not more than 0.1% by weight, and most preferably substantially 0% by weight of crystals having sizes of 4 mm or more as determined by sieve analysis. As long as the content of such large-sized crystals in the potassium fluoroniobate crystals falls in this range, the quantitative supply of the crystals to the reduction oven can easily be done, and, in addition, even the central parts of the crystals fully undergo reduction.

EXAMPLES

The present invention will now be explained more specifically by referring to the following Examples. However, these examples are not intended to restrict the scope of the invention in any way.

Example 1
Synthesis of Coarse Crystals (First Step)

By properly changing the composition of the starting material and the synthesis conditions, coarse potassium oxyfluoroniobate and/or fluoroniobate crystals were obtained (Synthesis Examples 1 to 25). The compositions of the starting materials and the synthesis conditions used in Synthesis Examples 1 to 25 are shown in Table 1.

In each Synthesis Example, 1000 ml of a starting material was prepared by blending a niobium solution (concentration of niobium determined by ICP emission spectroscopic analysis: 295 g/l, solvent: an extremely thin aqueous solution of hydrofluoric acid), a 55 wt. % hydrofluoric acid solution and pure water in amounts as shown in Table 1. Potassium chloride as a precipitant was added to and reacted with the starting material that was at room temperature (23 to 27° C., abbreviated to "RT" in the table) or had been heated to 60° C. Thereafter, to fully precipitate potassium oxyfluoroniobate and/or fluoroniobate as coarse crystals, the reaction solution was cooled to room temperature in the case where the starting material had been heated to 60° C., or allowed to stand as it was in the case where the starting material had not been heated. The coarse crystals were then separated by filtration.

The coarse crystals thus obtained were placed in a PTFE (polytetrafluoroethylene)-made container, and dried in a thermostatic dryer at 120° C. for approximately 15 hours. The X-ray diffraction pattern of the coarse crystals was obtained by the use of an X-ray diffractometer, and used to determine the chemical composition of the coarse crystals. Further, the amount of niobium contained in the filtrate was measured by IPC emission spectroscopic analysis, and the yield was calculated on the basis of the amount of niobium contained in the starting material, using the following equation:

Yield (%)=100−[(the amount of niobium contained in the filtrate)/(the amount of niobium contained in the starting material)]×100

The results are shown in Table 1.

TABLE 1

| Synthesis Example No. | Components of Starting material | | | Starting material (1000 mL) | | | Synthesis Conditions | | | Molar ratio | Results | | |
|---|---|---|---|---|---|---|---|---|---|---|---|---|---|
| | Nb Solution | 55% HF | Pure Water | Concentration of HF | Nb Content | | Temperature | KCl | | | Yield | X-ray diffraction pattern | |
| | mL | mL | mL | % | g/L | mol | °C. | g | mol | K/Nb | % | $K_3Nb_2F_{11}O$ | $K_2NbF_7$ |
| 1 | 370 | 240 | 390 | 14.6 | 109.2 | 1.175 | RT | 200 | 2.683 | 2.28 | 94.2 | ⊚ + ? | X |
| 2 | 370 | 240 | 390 | 14.6 | 109.2 | 1.175 | RT | 250 | 3.353 | 2.85 | 96.1 | ⊚ + ? | X |
| 3 | 370 | 240 | 390 | 14.6 | 109.2 | 1.175 | RT | 300 | 4.024 | 3.42 | 96.6 | ⊚ + ? | X |
| 4 | 370 | 240 | 390 | 14.6 | 109.2 | 1.175 | RT | 350 | 4.695 | 4.00 | 97.8 | ⊚ + ? | X |
| 5 | 370 | 240 | 390 | 14.6 | 109.2 | 1.175 | RT | 500 | 6.707 | 5.71 | 99.0 | ⊚ + ? | X |
| 6 | 370 | 240 | 390 | 14.6 | 109.2 | 1.175 | 60 | 250 | 3.353 | 2.85 | 97.7 | ⊚ + ? | X |
| 7 | 270 | 240 | 490 | 14.6 | 79.7 | 0.857 | RT | 185 | 2.482 | 2.90 | 94.8 | ⊚ + ? | X |
| 8 | 500 | 240 | 260 | 14.6 | 147.5 | 1.588 | RT | 340 | 4.561 | 2.87 | 97.3 | ⊚ + ? | X |
| 9 | 370 | 330 | 300 | 19.8 | 109.2 | 1.175 | RT | 250 | 3.353 | 2.85 | 97.5 | ⊚ | ○ |
| 10 | 370 | 330 | 300 | 19.8 | 109.2 | 1.175 | RT | 300 | 4.024 | 3.42 | 98.3 | ○ | ⊚ |
| 11 | 370 | 330 | 300 | 19.8 | 109.2 | 1.175 | RT | 350 | 4.695 | 4.00 | 98.7 | Δ | ⊚ |
| 12 | 370 | 420 | 210 | 24.9 | 109.2 | 1.175 | RT | 250 | 3.353 | 2.85 | 97.9 | ○ | ⊚ |
| 13 | 370 | 420 | 210 | 24.9 | 109.2 | 1.175 | RT | 300 | 4.024 | 3.42 | 98.8 | ○ | ⊚ |
| 14 | 370 | 420 | 210 | 24.9 | 109.2 | 1.175 | RT | 350 | 4.695 | 4.00 | 99.2 | Δ | ⊚ |
| 15 | 370 | 520 | 110 | 30.4 | 109.2 | 1.175 | RT | 250 | 3.353 | 2.85 | 98.6 | Δ | ⊚ |
| 16 | 370 | 70 | 560 | 4.3 | 109.2 | 1.175 | RT | 250 | 3.353 | 2.85 | 65.2 | ? | X |
| 17 | 370 | 70 | 560 | 4.3 | 109.2 | 1.175 | RT | 300 | 4.024 | 3.42 | 73.3 | ? | X |
| 18 | 160 | 240 | 600 | 14.6 | 47.2 | 0.508 | RT | 110 | 1.475 | 2.90 | 66.2 | ⊚ + ? | X |
| 19 | 160 | 240 | 600 | 14.6 | 47.2 | 0.508 | RT | 130 | 1.744 | 3.43 | 68.4 | ⊚ + ? | X |
| 20 | 160 | 420 | 420 | 24.9 | 47.2 | 0.508 | RT | 110 | 1.475 | 2.90 | 72.3 | ⊚ + ? | X |
| 21 | 370 | 240 | 390 | 14.6 | 109.2 | 1.175 | RT | 145 | 1.945 | 1.66 | 78.8 | ⊚ + ? | X |
| 22 | 370 | 420 | 210 | 24.9 | 109.2 | 1.175 | RT | 145 | 1.945 | 1.66 | 80.3 | ⊚ + ? | Δ |
| 23 | 370 | 420 | 210 | 24.9 | 109.2 | 1.175 | 60 | 145 | 1.945 | 1.66 | 81.9 | ⊚ + ? | Δ |

TABLE 1-continued

| Syn-thesis Example No. | Components of Starting material | | | Starting material (1000 mL) | | | Synthesis Conditions | | | | Results | | |
|---|---|---|---|---|---|---|---|---|---|---|---|---|---|
| | Nb Solution mL | 55% HF mL | Pure Water mL | Concentration of HF % | Nb Content | | Temperature °C. | KCl | | Molar ratio K/Nb | Yield % | X-ray diffraction pattern | |
| | | | | | g/L | mol | | g | mol | | | $K_3Nb_2F_{11}O$ | $K_2NbF_7$ |
| 24 | 370 | 420 | 210 | 24.9 | 109.2 | 1.175 | RT | 130 | 1.744 | 1.48 | 50.3 | ⊚ + ? | X |
| 25 | 690 | 40 | 270 | 2.5 | 203.6 | 2.191 | RT | 1200 | 16.096 | 7.35 | 99.0 | ? | X |

Criteria employed for evaluating the X-ray diffraction patterns are as follows:
⊚: the main peak is observed,
○: peaks are clearly observed,
Δ: peaks are slightly observed,
X: no peak is observed, and
?: peaks that seem to be characteristic of potassium oxyfluoroniobates other than $K_3Nb_2F_{11}O$ are observed.

The data in Table 1 show that the coarse crystals obtained in the first step can contain either potassium oxyfluoroniobate or potassium fluoroniobate, or both of them depending upon the composition of the starting material used and the synthesis conditions employed. Further, when the results of Synthesis Examples 1 to 15 are compared with those of Synthesis Examples 16 to 25, it can be understood that the coarse crystals can be obtained in a high yield of more than 90%, more specifically more than 94% as long as the first step of the invention is effected under the preferable conditions (i.e., the concentration of niobium in the starting material: 60 to 200 g/l, the concentration of hydrofluoric acid in the starting material: 10 to 35% by weight, and the amount of the potassium-containing electrolyte to be added, as indicated by the molar ratio of potassium to niobium: 2 to 10). Furthermore, the results of Synthesis Example 25 show that, even if the concentration of hydrofluoric acid in the starting material is low, coarse crystals can be obtained in high yield if the molar ratio K/Nb is made high. It is noted that "molar ratio K/Nb" in Table 1 means not the molar ratio of K to Nb in the coarse crystals but the molar ratio of K in the potassium-containing electrolyte to Nb in the starting material. Even when the syntheses are carried out under the conditions that are not within the above-described preferable ranges (Synthesis Examples 16 to 25), yields of more than 50% were attained. Although these yields (with an exception of the yield in Synthesis Example 25) are lower than those in Synthesis Examples in which the syntheses were carried out under the preferable conditions, it is needless to say that Synthesis Examples 16 to 25 are also included in the present invention.

Example 2
Synthesis I of Potassium Fluoroniobate Crystals via Recrystallization (Second Step)

Potassium fluoroniobate was recrystallized from a recrystallization solvent, where the concentration of hydrofluoric acid in the recrystallization solvent and the amount of coarse potassium fluoroniobate crystals to be dissolved in the recrystallization solvent were changed as shown in Table 2 (Recrystallization Examples 1 to 7).

Coarse potassium fluoroniobate crystals to be subjected to recrystallization were firstly prepared by conducting synthesis under the same conditions as in Synthesis Example 2 in Example 1, provided that the operation scale was made greater. Recrystallization solvents for use in Recrystallization Examples 1 to 7 were then respectively prepared by blending a 55 wt. % hydrofluoric acid solution and pure water in amounts as shown in Table 2. In each Recrystallization Example, the recrystallization solvent was heated to 60° C., and the above coarse crystals (synthesis product) were dissolved in the solvent in an amount as shown in Table 2 while keeping the temperature of the solvent; the solution obtained was cooled to room temperature at a cooling rate of 5° C./h to precipitate potassium fluoroniobate as crystals; the crystals were filtered off and washed with an aqueous potassium chloride solution having a concentration of 100 g/l, thereby obtaining potassium fluoroniobate crystals of the present invention. After measuring the wet weight, the crystals were placed in a PTFE-made container, dried in a thermostatic drier at 120° C. for approximately 15 hours, and weighed. Further, the dried crystals were subjected to X-ray diffractometry, and the X-ray diffraction pattern obtained was used to determine the chemical composition of the crystals. The results are shown in Table 2.

TABLE 2

| Recrystallization Example | Recrystallization Solvent | | | | Amount of Synthesis Product Dissolved | | Amount of Crystals obtained by Recrystallization | | X-ray diffraction pattern | |
|---|---|---|---|---|---|---|---|---|---|---|
| | 55% HF mL | Pure Water mL | Total mL | Concentration of HF % | wet g | dry (calculated) g | wet g | dry g | $K_2Nb_2F_{11}O$ | $K_3NbF_7$ |
| 1 | 1410 | 3590 | 5000 | 17.0 | 1200 | 1107 | 715 | 685 | X | ⊚ |
| 2 | 1670 | 3330 | 5000 | 20.0 | 980 | 904 | 521 | 496 | X | ⊚ |
| 3 | 2110 | 2890 | 5000 | 25.0 | 810 | 747 | 423 | 397 | X | ⊚ |
| 4 | 2050 | 1950 | 4000 | 30.0 | 1000 | 922 | 535 | 515 | X | ⊚ |
| 5 | 400 | 4600 | 5000 | 5.0 | 2280 | 2103 | 1668 | 1204 | ⊚ | X |

TABLE 2-continued

| Recrystallization Example | Recrystallization Solvent | | | | Amount of Synthesis Product Dissolved | | Amount of Crystals obtained by Recrystallization | | X-ray diffraction pattern | |
|---|---|---|---|---|---|---|---|---|---|---|
| | Pure 55% HF mL | Water mL | Total mL | Concentration of HF % | wet g | dry (calculated) g | wet g | dry g | $K_2Nb_2F_{11}O$ | $K_3NbF_7$ |
| 6 | 820 | 4180 | 5000 | 10.1 | 1900 | 1752 | 1334 | 1088 | ⊚ | X |
| 7 | 1240 | 3760 | 5000 | 15.0 | 1360 | 1254 | 846 | 716 | ⊚ | ○ |

Criteria employed for evaluating the X-ray diffraction patterns are as follows:
⊚: the main peak is observed,
○: peaks are clearly observed,
Δ: peaks are slightly observed, and
X: no peak is observed.

The data shown in Table 2 demonstrate the following. The crystals obtained in Recrystallization Examples 1 to 4 where the concentration of hydrofluoric acid in each recrystallization solvent used was 16% by weight or more, which was in the preferable range, were found to be potassium fluoroniobate crystals of the present invention. On the other hand, the crystals obtained in Recrystallization Examples 5 to 7 where the concentration of hydrofluoric acid in each recrystallization solvent used was less than 16% by weight, which was not in the preferable range, were found to be crystals chiefly composed of potassium oxyfluoroniobate crystals.

Further, coarse crystals were synthesized under the same conditions as in Synthesis Examples 7, 8, 11, 15, 16, 19 or 23 in Example 1, provided that the production scale was made greater. These coarse crystals were respectively subjected to recrystallization under the same conditions as in the above-described Recrystallization Example 2, and the crystals thus obtained were subjected to X-ray diffractometry to obtain X-ray diffraction patterns. From the X-ray diffraction patterns, all of these crystals were found to have the chemical composition $K_2NbF_7$, and thus identified as potassium fluoroniobate.

Example 3
Synthesis II of Potassium Fluoroniobate Crystals via Recrystallization (Second Step)

Coarse crystals different from those used in Example 2, having an X-ray diffraction pattern not having the main peak of $K_3Nb_2F_{11}O$ or $K_2NbF_7$ but having peaks that seemed to be those of potassium oxyfluoroniobates other than $K_3Nb_2F_{11}O$ were subjected to recrystallization in the same manner as in Example 2. Namely, the above coarse crystals were dissolved in a recrystallization solvent, and potassium fluoroniobate was recrystallized from this solution, where the concentration of hydrofluoric acid in the recrystallization solvent was changed as shown in Table 3 (Recrystallization Examples 8 to 14).

Coarse crystals to be subjected to recrystallization were firstly prepared by conducting synthesis under the same conditions as in Synthesis Example 25 in Example 1, provided that the operation scale was made greater. As can be known from the data in Table 1, the coarse crystals have such an X-ray diffraction pattern that, although the main peak of $K_3Nb_2F_{11}O$ or $K_2NbF_7$ cannot be observed, peaks that seem to be those of potassium oxyfluoroniobates other than $K_3Nb_2F_{11}O$ are observed. It is noted that, since the ICDD card for X-diffraction analysis does not contain the chemical compositions $K_2NbOF_5$ and $K_2NbOF_5 \cdot H_2O$, it is difficult to identify the "peaks that seem to be those of potassium oxyfluoroniobates" as substances having these chemical compositions. The coarse crystals were subjected to recrystallization in the same manner as in Example 2, and then to X-ray diffractometry. From the X-ray diffraction pattern obtained, the chemical composition of the crystals was determined. The results are shown in Table 3.

TABLE 3

Relationship between Concentration of Hydrofluoric Acid in Recrystallization Solvent and Chemical Composition of Crystal

| Recrystallization Example No. | Concentration of HF in Recrystallization Solvent (wt. %) | X-ray Diffraction pattern | |
|---|---|---|---|
| | | $K_3Nb_2F_{11}O$ | $K_2NbF_7$ |
| 8 | 12.0 | X | ⊚ |
| 9 | 15.0 | X | ⊚ |
| 10 | 17.0 | X | ⊚ |
| 11 | 20.0 | X | ⊚ |
| 12 | 25.0 | X | ⊚ |
| 13 | 30.0 | X | ⊚ |
| 14 | 10.1 | ⊚ | X |

Criteria employed for evaluating the X-ray diffraction patterns are as follows:
⊚: the main peak is observed,
○: peaks are clearly observed,
Δ: peaks are slightly observed, and
X: no peak is observed.

The data shown in Table 3 demonstrate the following. The crystals obtained in Recrystallization Examples 8 to 13 where the concentration of hydrofluoric acid in each recrystallization solvent used was 12% by weight or more were found to be potassium fluoroniobate crystals of the present invention. On the other hand, the crystals obtained in Recrystallization Example 14, in which the concentration of hydrofluoric acid in the recrystallization solvent used was less than 12% by weight, were found to be crystals consisting essentially of potassium oxyfluoroniobate crystals.

Further, the results of Examples 1 to 3 show the following. Namely, it is believed that potassium oxyfluoroniobate crystals having the chemical composition $K_3Nb_2F_{11}O$ (the coarse crystals used in Example 2, prepared in accordance with Synthesis Example 2) can be prepared, in the first step, under the conditions whose preferable range is wider than that of the conditions under which potassium oxyfluoroniobate crystals that do not have the chemical composition $K_3Nb_2F_{11}O$ (the coarse crystals used in Example 3, prepared in accordance with Synthesis Example 25) can be prepared. However, as can be known from the results of Example 3, highly pure potassium fluoroniobate crystals ($K_2NbF_7$), an object of the present invention, can successfully be obtained even from potassium oxyfluoroniobate crystals that do not have the chemical composition $K_3Nb_2F_{11}O$. Moreover, in this case, desired potassium fluoroniobate crystals can be obtained even by the use of a recrystallization solvent whose hydrofluoric acid content is as low as 12% by weight.

Example 4
Effects of Washing Conducted in Second Step

Potassium fluoroniobate crystals separated by filtration were washed in the second step under different conditions to examine the effects of washing on the chemical composition of the crystals. The liquids used for this washing are shown in Table 4.

First of all, potassium fluoroniobate crystals were produced under the same conditions as in Recrystallization Example 2 in Example 2, provided that the recrystallization solvent and the coarse crystals were used in amounts 4 times larger than those in Recrystallization Example 2 and that the crystals obtained by recrystallization were not dried. Thereafter, 200 g of the crystals obtained (wet) were washed with 100 ml of one of the liquids shown in Table 3, placed in a PTFE-made container, and dried in a thermostatic drier at 120° C. for approximately 15 hours. The dried crystals were subjected to X-ray diffractometry, and the X-ray diffraction pattern obtained was used to determine the chemical composition of the crystals. The results are shown in Table 4.

TABLE 4

| Liquid Used for Washing | X-ray Diffraction Pattern | |
|---|---|---|
| | $K_3Nb_2F_{11}O$ | $K_2NbF_7$ |
| Not used (not washed) | X | ⊚ |
| Pure water | ○ | ⊚ |
| 10 g/l KCl | Δ | ⊚ |
| 50 g/l KCl | X | ⊚ |
| 100 g/l KCl | X | ⊚ |
| 250 g/l KCl | X | ⊚ |

Criteria employed for evaluating the X-ray diffraction patterns are as follows:
⊚: the main peak is observed,
○: peaks are clearly observed,
Δ: peaks are slightly observed, and
X: no peak is observed.

The results shown in Table 4 demonstrate that potassium oxyfluoroniobate is secondarily produced if the potassium fluoroniobate crystals are washed with pure water, whereas potassium oxyfluoroniobate is not secondarily produced when the crystals are washed with an aqueous potassium chloride solution (preferably having a concentration of 50 g/l or more) Also in the case where the crystals are not washed at all, potassium oxyfluoroniobate is not secondarily produced. In this case, however, the crystals generate hydrogen fluoride vapor during the drying process, so that the drier used can be damaged by this vapor. It is thus found to be favorable that the potassium fluoroniobate crystals be washed with an aqueous KCl solution (preferably having a concentration of 50 g/l or more) after they are separated by filtration.

Example 5
Effects of Cooling Rate in Second Step

The effects of the cooling rate in the second step on crystal size were examined by changing as shown in Table 5 the cooling rate upon recrystallization.

Specifically, potassium fluoroniobate crystals were produced under the same conditions as in Recrystallization Example 2 in Example 2, provided that one of the cooling rates shown in Table 5 was used. The crystal size distributions of the crystals obtained by using different cooling rates were then respectively determined by sieve analysis. The sieve analysis was conducted in the following manner. The potassium fluoroniobate crystals obtained were firstly sifted through a sieve having an opening of 4.00 mm, and the crystals remaining on this sieve were weighed. Those crystals that had passed through the above sieve were sifted through a sieve having an opening of 1.70 mm, and the crystals remaining on this sieve were weighed. In this manner, the crystals were then successively sifted through a sieve having an opening of 0.35 mm and that having an opening of 0.045 mm, and the crystals passed through these sieves were respectively weighed. Percentages by weight of the crystals having sizes of less than 0.045 mm, those having sizes of 0.045 mm or more and less than 0.35 mm, those having sizes of 0.35 mm or more and less than 0.50 mm, those having sizes of 0.50 mm or more and less than 1.70 mm, those having sizes of 1.70 mm or more and less than 4.00 mm, and those having sizes of 4.00 mm or more were obtained by calculation. The results are shown in Table 5.

TABLE 5

Cooling Rate vs. Crystal Size Distribution (wt. %)

| Range of Crystal Size (mm) | Cooling Rate (° C./h) | | |
|---|---|---|---|
| | 5 | 15 | 30 |
| less than 0.045 | 0.6 | 1.5 | 18.0 |
| 0.045 or more and less than 0.35 | 6.0 | 14.5 | 43.0 |
| 0.35 or more and less than 0.50 | 11.3 | 26.5 | 25.0 |
| 0.50 or more and less than 1.70 | 40.3 | 50.0 | 13.0 |
| 1.70 or more and less than 4.00 | 41.8 | 7.5 | 1.0 |
| 4.00 or more | 0.0 | 0.0 | 0.0 |
| total of 0.50 or more | 82.1 | 57.5 | 14.0 |

The data in Table 5 show the following. In the case where the cooling rate was below 20° C./h (specifically, 5° C./h and 15° C./h), the crystals obtained were found to contain more than 50% by weight (more than 80% by weight when the cooling rate was 5° C./h,) of crystals having particle sizes of 0.50 mm or more; this means that large-sized crystals were obtained in a large amount. On the other hand, when the cooling rate was in excess of 20° C./h (specifically, 30° C./h), the crystals obtained were found to contain only 10 percent level by weight of crystals having particle sizes of 0.50 mm or more; this means that large-sized crystals were obtained only in a small amount.

Example 6
Chemical Composition Analysis

Some of the coarse crystals synthesized and the crystals finally obtained via recrystallization (potassium fluoroniobate crystals) in the aforementioned Examples 1 to 5 were analyzed to determine the chemical compositions of their main components. Specifically, to determine the percentages of K and Nb, the crystals were dissolved in hydrofluoric acid and aqua regia, respectively, and the solutions were subjected to ICP emission spectroscopic analysis; and to determine the percentage of F, the crystals were subjected firstly to alkali fusion, then to extraction with hot water, and finally to the fluoride ion electrode method. The results are shown in Table 6.

TABLE 6

|  | K | Nb | F | Molar Ratio K/Nb |
|---|---|---|---|---|
|  | (% by weight) | | | |
| Synthesis Example 2 (Example of the Invention) | 24.1 | 35.2 | 40.0 | 1.63 |
| Synthesis Example 25 (Example of the Invention) | 34.6 | 23.9 | 28.0 | 3.44 |
| Recrystallization Example 2 (Example of the Invention) | 25.4 | 30.5 | 44.0 | 1.98 |
| Recrystallization Example 3 (Example of the Invention) | 25.6 | 30.8 | 43.5 | 1.98 |
| Recrystallization Example 6 (Comparative Example) | 24.4 | 34.1 | 40.5 | 1.70 |
| Recrystallization Example 7 (Comparative Example) | 24.8 | 34.2 | 40.8 | 1.72 |
| Potassium Oxyfluoroniobate $K_3Nb_2F_{11}O$ (calculated) | 22.2 | 35.2 | 39.6 | 1.50 |
| Potassium Fluoroniobate $K_2NbF_7$ (calculated) | 25.7 | 30.6 | 43.7 | 2.00 |

The data shown in Table 6 demonstrate the following. The coarse crystals obtained in Synthesis Example 2 have the chemical composition nearly equal to that of potassium oxyfluoroniobate. The crystals obtained in Recrystallization Examples 2 and 3 have the chemical compositions that are almost identical to that of potassium fluoroniobate. The crystals obtained in Recrystallization Examples 6 and 7 have the chemical compositions close to that of potassium oxyfluoroniobate. It is thus confirmed that these results support the chemical compositions of the crystals determined from the X-ray diffraction patterns in the above Examples.

Example 7
Synthesis III of Potassium Fluoroniobate Crystals via Recrystallization Using Recrystallization Solvent further Containing Hydrochloric Acid (Second Step)

Potassium fluoroniobate was recrystallized from a recrystallization solvent containing both hydrofluoric acid and hydrochloric acid, where the concentrations of hydrofluoric acid and hydrochloric acid in the recrystallization solvent and the amount of coarse potassium fluoroniobate crystals to be dissolved in the recrystallization solvent were changed as shown in Table 7 (Recrystallization Examples 15 to 20).

Coarse potassium fluoroniobate crystals to be subjected to recrystallization were firstly prepared by conducting synthesis under the same conditions as in Synthesis Example 2 in Example 1, provided that the operation scale was made greater. Recrystallization solvents for use in Recrystallization Examples 15 to 20 were then respectively prepared by blending hydrofluoric acid, hydrochloric acid and pure water so that the concentrations of hydrofluoric acid and hydrochloric acid in the solvent would be as shown in Table 7. In each Recrystallization Example, the recrystallization solvent was heated to 60° C., and the above coarse crystals (synthesis product) were dissolved in the solvent in an amount as shown in Table 7 while keeping the temperature of the solvent; the solution obtained was cooled to room temperature at a cooling rate of 5° C./h to precipitate potassium fluoroniobate as crystals; the crystals were filtered off and washed with an aqueous potassium chloride solution having a concentration of 100 g/l, thereby obtaining potassium fluoroniobate crystals of the present invention. After measuring the wet weight, the crystals were placed in a PTFE-made container, dried in a thermostatic drier at 120° C. for approximately 15 hours, and weighed. Further, the crystals were subjected to X-ray diffractometry, and the X-ray diffraction pattern obtained was used to determine the chemical composition of the crystals. The results are shown in Table 7.

TABLE 7

| Recrystallization Example | Recrystallization Solvent | | | Amount of Synthesis Product Dissolved | | Amount of Crystals obtained by Recrystallization | | X-ray diffraction pattern | |
|---|---|---|---|---|---|---|---|---|---|
|  | Amount of Solvent | Concentration of HF | Concentration of HCl | wet | dry | wet | dry | | |
|  | mL | % | % | g | g | g | g | $K_2Nb_2F_{11}O$ | $K_2NbF_7$ |
| 15 | 5000 | 17 | 2.5 | 1290 | 1190 | 798 | 755 | X | ⊚ |
| 16 | 5000 | 17 | 5.0 | 1380 | 1273 | 866 | 826 | X | ⊚ |
| 17 | 5000 | 17 | 7.5 | 1460 | 1347 | 927 | 882 | X | ⊚ |
| 18 | 5000 | 20 | 5.0 | 1130 | 1042 | 635 | 608 | X | ⊚ |
| 19 | 5000 | 25 | 5.0 | 940 | 867 | 515 | 492 | X | ⊚ |
| 20 | 4000 | 30 | 5.0 | 1150 | 1061 | 665 | 630 | X | ⊚ |

Criteria employed for evaluating the X-ray diffraction patterns are as follows:
⊚: the main peak is observed,
○: peaks are clearly observed,
Δ: peaks are slightly observed, and
X: no peak is observed.

As shown in Table 7, the recrystallization solvents used in Recrystallization Examples 15 to 20 in this Example 7 contained hydrofluoric acid in concentrations similar to those of hydrofluoric acid in the recrystallization solvents used in Recrystallization Examples 1 to 4 in Example 2, and further contained hydrochloric acid. Specifically, when viewed from the composition of the recrystallization solvent employed and the amount of the same used, Recrystallization Examples 15 to 17 in Example 7 agree with Recrystallization Example 1 in Example 2; Recrystallization Example 18 in Example 7 agrees with Recrystallization Example 2 in Example 2; Recrystallization Example 19 in Example 7 agrees with Recrystallization Example 3 in Example 2; and Recrystallization Example 20 in Example 7 agrees with Recrystallization Example 4 in Example 2, provided that the recrystallization solvents used in Example 7 further contain hydrochloric acid. From the comparison between the results of Recrystallization Examples in Example 7 and those of the corresponding Recrystallization Examples in Example 2, the following can be known. Namely, when the recrystallization solvents containing not only hydrofluoric acid but also hydrochloric acid were used, the coarse crystals showed higher solubility at a temperature of 60° C., so that it was possible to dissolve the coarse crystals in such recrystallization solvents in increased amounts. In fact, in the previously mentioned Recrystallization Examples 1 to 4 in Example 2, it was impossible to dissolve the coarse crystals in the recrystallization solvents (containing no hydrochloric acid) in the same amounts as in Example 7. Further, in Example 7, the coarse crystals were dissolved in the recrystallization solvents in increased amounts, and, as a result, crystals were obtained in drastically increased amounts via recrystallization. Moreover, the crystals thus obtained were confirmed to be highly pure potassium fluoroniobate crystals containing no potassium oxyfluoroniobate crystals.

What is claimed is:

1. A method for producing potassium fluoroniobate crystals, comprising the first and second steps (a) and (b) of:

(a) adding a potassium-containing electrolyte to a starting material comprising niobium to precipitate potassium oxyfluoroniobate and/or fluoroniobate as coarse crystals, and separating the coarse crystals by filtration; and (b) dissolving the coarse crystals in a recrystallization solvent that is an aqueous solution comprising 12 to 35% by weight of hydrofluoric acid and that has been heated to a temperature of 50° C. or more to form a solution, and cooling the solution to 40° C. or lower at a cooling rate of less than 20° C./h to form a precipitate potassium fluoroniobate as crystals in a fluid.

2. The method for producing potassium fluoroniobate crystals according to claim 1, wherein the recrystallization solvent further contains 1 to 10% by weight of hydrochloric acid.

3. The method for producing potassium fluoroniobate crystals according to claim 1, wherein the coarse potassium oxyfluoroniobate crystals comprise a substance that is identified as $K_3Nb_2F_{11}O$ by X-ray diffractometry.

4. The method for producing potassium fluoroniobate crystals according to claim 1, wherein the molar ratio K/Nb in the coarse crystals is from 1.0 to 5.0.

5. The method for producing potassium fluoroniobate crystals according to claim 1, wherein the starting material comprises 60 to 400 g/l of niobium and not more than 35% by weight of hydrofluoric acid.

6. The method for producing potassium fluoroniobate crystals according to claim 1, wherein the potassium-containing electrolyte is added to the starting material in such an amount that the molar ratio of potassium to niobium will be from 2 to 10.

7. The method for producing potassium fluoroniobate crystals according to claim 1, wherein the recrystallization solvent is an aqueous solution comprising 16 to 30% by weight of hydrofluoric acid.

8. The method for producing potassium fluoroniobate crystals according to claim 1, further comprising the step of recycling, as a part or whole of the recrystallization solvent in the second step (b), the supernatant liquid of the fluid containing the potassium fluoroniobate crystals that have precipitated and/or the filtrate obtained from the filtration of the fluid.

9. The method for producing potassium fluoroniobate crystals according to claim 1, wherein the potassium fluoroniobate crystals obtained in the second step (b) are washed with an aqueous solution of a potassium-containing electrolyte, and then dried.

10. The method for producing potassium fluoroniobate crystals according to claim 1, further comprising the step of passing the potassium fluoroniobate crystals obtained in the second step (b) through a sieve having an opening of 3.35 to 6.7 mm.

11. Potassium fluoroniobate crystals consisting essentially of potassium fluoroniobate, containing 30% by weight or more of crystals having sizes of 0.5 mm or more as measured by sieve analysis.

12. The potassium fluoroniobate crystals according to claim 11, containing not more than 10% by weight of crystals having sizes of less than 0.045 mm as measured by sieve analysis.

13. The potassium fluoroniobate crystals according to claim 11, containing not more than 1% by weight of crystals having sizes of 4 mm or more as measured by sieve analysis.

14. The potassium fluoroniobate crystals according to claim 12, containing not more than 1% by weight of crystals having sizes of 4 mm or more as measured by sieve analysis.

15. The method for producing potassium fluoroniobate crystals according to claim 2, wherein the coarse potassium oxyfluoroniobate crystals comprise a substance that is identified as $K_3Nb_2F_1O$ by X-ray diffractometry.

16. The method for producing potassium fluoroniobate crystals according to claim 2, wherein the molar ratio K/Nb in the coarse crystals is from 1.0 to 5.0.

17. The method for producing potassium fluoroniobate crystals according to claim 2, wherein the starting material comprises 60 to 400 g/l of niobium and not more than 35% by weight of hydrofluoric acid.

18. The method for producing potassium fluoroniobate crystals according to claim 2, wherein the potassium-containing electrolyte is added to the starting material in such an amount that the molar ratio of potassium to niobium will be from 2to 10.

19. The method for producing potassium fluoroniobate crystals according to claim 2, wherein the recrystallization solvent is an aqueous solution comprising 16 to 30% by weight of hydrofluoric acid.

20. The method for producing potassium fluoroniobate crystals according to claim 2, further comprising the step of recycling, as a part or whole of the recrystallization solvent in the second step (b), the supernatant liquid of the fluid containing the potassium fluoroniobate crystals that have precipitated and/or the filtrate obtained from the filtration of the fluid.

* * * * *

UNITED STATES PATENT AND TRADEMARK OFFICE
CERTIFICATE OF CORRECTION

PATENT NO. : 6,800,268 B2
DATED : October 5, 2004
INVENTOR(S) : Uchino et al.

It is certified that error appears in the above-identified patent and that said Letters Patent is hereby corrected as shown below:

Column 20,
Line 32, "$K_3Nb_2F_1$" should read -- $K_3Nb_2F_{11}$ --
Line 44, "from 2to 10" should read -- from 2 to 10 --

Signed and Sealed this

Twenty-sixth Day of April, 2005

JON W. DUDAS
*Director of the United States Patent and Trademark Office*